United States Patent [11] 3,582,959

[72] Inventor Takao Matsumoto
 60, Kuritaya, Kanagaina-ku, Yokohama-shi, Japan
[21] Appl. No. 703,297
[22] Filed Feb. 6, 1968
[45] Patented June 1, 1971
[32] Priority Feb. 6, 1967
[33] Japan
[31] 42/7609

[54] WIDE RANGE LOGARITHMIC RECORDING APPARATUS
 8 Claims, 7 Drawing Figs.
[52] U.S. Cl. ........................................... 346/65, 324/113
[51] Int. Cl. ........................................... G01r 13/04
[50] Field of Search........................................ 346/32, 65; 324/113, 100, 115

[56] References Cited
UNITED STATES PATENTS
3,405,359 10/1968 Gilman et al. ................ 324/115X
3,471,782 10/1969 Matsumoto .................. 324/113

Primary Examiner—Joseph W. Hartary
Attorney—Ernest G. Montague

ABSTRACT: A wide range logarithmic recording apparatus comprising a range switching circuit including resistors connected to respective digits and arranged to receive electric signals to be recorded, and a potentiometer type balancing circuit including a logarithmic variable resistor. Input signals are fed jointly to the range switching circuit and to the balancing circuit. An automatic control circuit is provided and includes a rotary switching device coupled to the logarithmic variable resistor, and a group of relays are actuated by the switching device and a range switching circuit is controlled by the relay. A chopper is connected to receive the difference between the output from the range switching circuit and the output from the balancing circuit and a servomotor is responsive to the chopper output to drive the rotary switching device, the logarithmic variable resistor and the range switching device, and a writing means is driven by the range switching device to record the signal.

WIDE RANGE LOGARITHMIC RECORDING APPARATUS

The present invention relates to wide range logarithmic recording apparatus having high accuracy and can be automatically switched over a wide range.

Commercially available recording apparatuses usually have linear characteristics, but when they are used for performing recording over a wide range it is difficult to provide essentially linear characteristic over a wide range. For this reason, in order to perform recordings over a wide range it is necessary to switch digits. However, with such an arrangement it is impossible not only to establish proper correlation among digits but also to readily find out overall characteristics.

For this reason, heretofore in order to record electric signals over a wide range it has been necessitated to provide a complicated preamplifier device having a logarithmic characteristic in addition to a recording device. However, such a preamplifier device was disadvantageous in that its logarithmic recording was limited to at most about four digits and that its accuracy was low.

It is one object of the present invention to eliminate the above described defects and to provide a novel wide range logarithmic recording apparatus which can record at high accuracies over a wide range without utilizing a preamplifier device and can switch digits automatically and continuously.

It is another object of the present invention to provide a wide range logarithmic recording apparatus comprising a range switching device including resistors connected to respective digits and arranged to receive electric signals to be recorded; a potentiometer type balancing circuit including a logarithmic variable resistor having a logarithmic characteristic; an automatic control circuit including a rotary switching device coupled to said logarithmic variable resistor, a group of relays actuated by said switching device and a range switching device controlled by the group of relays; a chopper connected to receive the difference between the output from the range switching circuit and the output from said balancing circuit and to cut off electric signals outside the recording range; a servomotor responsive to the output from the chopper to drive the rotary switching device, said logarithmic variable resistor and the range switching device; and a writing mechanism driven by the range switching device to record the electric signal on a recording medium.

Figure 1:
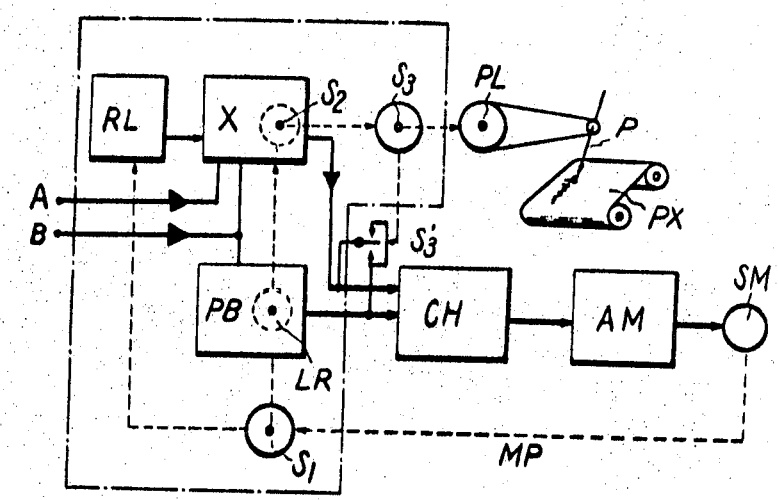
FIG. 1 is a block diagram of one embodiment of this invention.

Referring now to the drawings and more particularly to FIG. 1 which shows the essential components of a preferred embodiment of the present invention, electric signals to be recorded are supplied to a range switching circuit X through input terminals A and B. The difference between the output of the range switching circuit X and that from a potentiometer type balancing circuit PB is supplied to a chopper CH as a DC input. The AC output from chopper CH is amplified by an AC amplifier AM to provide an AC output corresponding to the electric signal and is applied to a servomotor SM thus generating a mechanical driving power indicated by a dotted line MP. As schematically shown in FIG. 1, the mechanical driving power drives a rotary switching device $S_1$, a logarithmic variable resistor LR, a range switching device $S_2$, a limit switch $S_3$ for operating contacts $S'_3$, and a pulley PL for driving a writing instrument, for example, a pen P, to record the signal on a recording paper PX.

Figure 7:
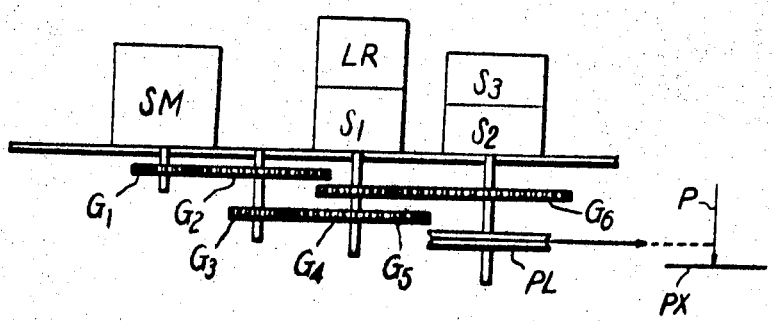
FIG. 7 is a schematic representation of a rotary driving mechanism.

FIG. 7 shows the mechanical arrangement of this driving system wherein the servomotor SM is shown as driving the logarithmic variable resistor LR, the rotary switching device $S_1$, the range switching device $S_2$ and the pulley PL through gears $G_1$, $G_2$, $G_3$, $G_4$, $G_5$ and $G_6$ of appropriate gear ratios. As shown in FIG. 7, the logarithmic variable resistor LR and the rotary switching device $S_1$ may be mounted on a common rotary shaft while the limit switch $S_3$, the range switching device $S_2$ and the pulley PL may be mounted on the other common rotary shaft. The pulley PL drives the recording pen P mounted on a dial system and the pen writes on the recording paper PX records of the digits equal to those of the range switching device $S_2$ with a logarithmic characteristic equal to that of the logarithmic variable resistor LR.

The purpose of the limit switch $S_3$ is to short circuit the input side of the chopper CH when the signal to be recorded reaches its maximum value or the minimum value thus preventing from going out of the recording range.

Figure 3:
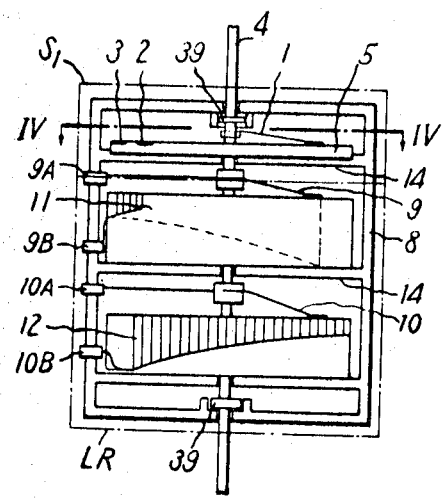
FIG. 3 is a longitudinal sectional view of a rotary switching device utilized in the invention.
Figure 4:
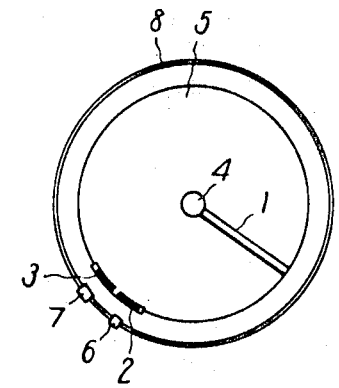
FIG. 4 is a cross-sectional view of the rotary switching device taken along a line 4—4 in FIG. 3.

The details of the construction of the rotary switching device $S_1$ and the logarithmic resistor LR employed in the present invention will now be considered by referring to FIGS. 3 and 4.

As shown in FIG. 3 the rotary switching device $S_1$ and the logarithmic variable resistor LR are housed in a common casing 8 and two closely spaced electrodes 2 and 3 are mounted on an insulator disc 5 contained in the casing 8. The center of the gap between the electrodes 2 and 3 is arranged such that, when viewed in the axial direction of the logarithmic variable resistor LR, the center will be positioned at the same angular position (hereinafter this position will be referred as the position of zero rotary angle) as the position at which the minimum value of the resistance winding 11 of the variable resistor and the maximum value of the resistance winding 12 occur. A brush 1 for the rotary switching device $S_1$ is mounted on the same shaft 4 as the logarithmic variable resistor LR and is secured at the same angular position as the brushes 9 and 10 of the logarithmic resistor LR, when viewed in the axial direction thereof, so that when the shaft 4 rotates, the brush 1 rotates by the same angles as brushes 9 and 10 to slidably engage electrodes 2 and 3. When the logarithmic variable resistor LR assumes the position of the zero rotary angle, the brush 1 of the rotary switching device will equally ride on electrodes 2 and 3.

Usually, the brush of the variable resistor LR has a width to simultaneously engage two or three turns of its resistance winding when the variable resistor LR assumes the position of zero rotary angle, that is, when the brush 9 reaches the position of the minimum value of the winding 9 and the brush 10 reaches the position of the maximum value of the winding 12, these two windings would be short-circuited. Accordingly, to prevent such short-circuiting, it is necessary to interrupt the connection between either one of brushes 9 and 10 and the outside circuit by means of a suitable relay means immediately before and after the occurrence of a short circuit, for a range of zero rotary angle $d\theta$. More particularly, referring now to FIGS. 2 and 4, when the brush 1 of the rotary switching device $S_1$ and brushes 9 and 10 of the logarithmic variable resistor LR rotate in the clockwise direction and reach an angle of rotation $0°-d\theta$, the brush 1 which has already been in contact with the electrode 2 will first come into contact with the electrode 3. Thus, the angular position $0°-d\theta$ corresponds to a point of preparing the rotary type switching device $S_1$ for switching. As the brush 1 of the rotary switching device $S_1$ continues to rotate and when it reaches an angular position $0°+d\theta$, the brush 1 begins to disengage electrode 2, but it still engages electrode 3. Thus, this angular position $0°+d\theta$ represents the actual switching point of the rotary switching device $S_1$. To this end it is advantageous to narrow the gap as far as possible between electrodes 2 and 3 and to make the width of the brush slightly wider than the gap. The circumferential length of the electrodes 2 and 3 of the rotary switching device is closely related to the angle subtended by two brushes and to the gaps between the electrodes of the range switching device $S_2$ as will be more clearly described later. Electrodes 2 and 3 of the rotary switching device $S_1$ are connected to terminals 6 and 7, respectively, which are secured to the casing 8 by insulating means. The logarithmic variable resistor LR is constructed such that the logarithmic characteristic of one digit is divided into two parts at the rotary angle of 180° and the portion corresponding to from 0° to 180° is wound as the resistance winding 11 and the portion corresponding to from 180° to 360° as the resistance winding 12, the windings being displaced 180° from each other and secured to a partition 14. As shown in FIG. 3, the rotary shaft 4 is journaled by ball bearings 39.

Figure 5:
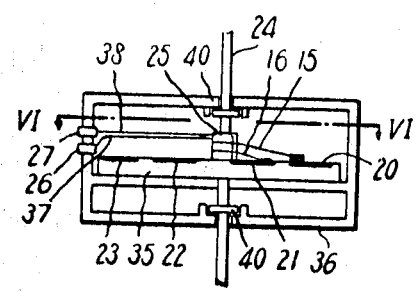
FIG. 5 is a longitudinal sectional view of a range switching device.
Figure 6:
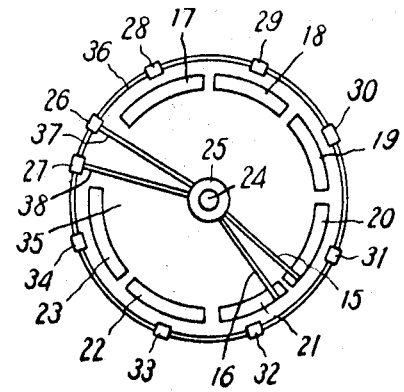
FIG. 6 is a cross-sectional view of the range switching device taken along the line 6—6 in FIG. 5.

As shown in FIGS. 5 and 6, the range switching device $S_2$ utilized in the present invention includes a member of spaced electrodes 17 through 23, inclusive, corresponding to respective digits, the electrodes being secured on the upper surface of an insulator disc 35 secured in the casing 36.

FIG. 6 illustrates a construction of seven digits but it should be understood that this invention is not limited to this particular number of digits. The electrode 17 corresponds to the maximum digit, whereas electrode 23 corresponds to the minimum digit and their circumferential lengths are longer than those of the other electrodes. The gap between electrodes 17 and 23 is considerably wider than the gaps between the other electrodes. The circumferential lengths of electrodes 18 through 22 are equal and the gaps therebetween are also equal. Brushes 15 and 16 are secured to a shaft 24 through an insulator 25 and are arranged to make slide contact with contact pieces 37 and 38, respectively, which are connected to terminals 26 and 27. As best shown in FIG. 6, the angle subtended by brushes 15 and 16 is narrower than the wide gap between electrodes 17 and 23, but it is wider than the gaps between the other electrodes.

When the brushes 9 and 10 of the logarithmic variable resistor LR are at the position of the zero rotary angle and the brush 1 of the rotary switching device $S_1$ contacts electrodes 2 and 3 over equal angles, the brushes 15 and 16 will engage two spaced adjacent electrodes with the bisector of the angle subtended by these brushes extending through the center of the gap between the electrodes.

Figure 2:
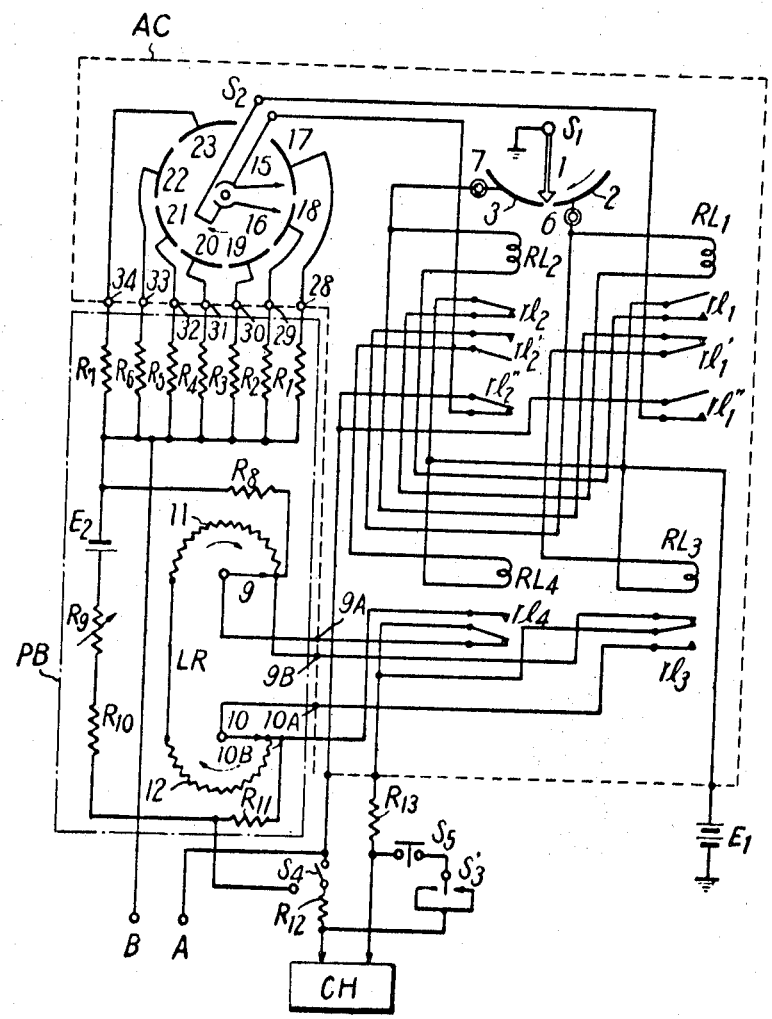
FIG. 2 is an electric circuit diagram of the invention for detecting drive signals.

When brushes 15 and 16 of the range switching device $S_2$ and brush 1 of the rotary switching device $S_1$ rotate in the clockwise direction as viewed in FIGS. 6, 4 and 2, as the brush 16 is ahead of brush 15, at an instant when brush 15 engages electrode 20 corresponding to a certain digit, the brush 16 will engage electrode 21 corresponding to the next digit, thus causing an undesirable effect. To prevent this, it is necessary to provide a construction such that the brush 1 of the rotary switching device $S_1$ would engage electrode 2 prior to that instant, whereby to interrupt the connection of the brush 16 of the range switching device $S_2$ to the external circuit, by energizing a relay circuit and that this condition should be continued to the actual switching point $0°+d\theta$ of the rotary switching device $S_1$. If it is now assumed that the angle subtended by brushes 15 and 16 of the range switching device $S_2$ is denoted by $\theta_1$, that by electrodes 1 and 2 by $\theta_2$, and that the angles between the position of the zero rotary angle of the rotary switching device $S_1$ and the extreme ends of the electrodes 2 and 3 are equal and represented by $\theta_3$, to accomplish this object, according to the present invention the lengths of electrodes of the rotary switching device $S_1$ are selected to satisfy the following relation;

$$\theta_3 > N(\theta_1 - \theta_2)/2$$

where $N$ represents the speed reduction ratio between the rotary switching device $S_1$ and the range switching device $S_2$. As shown in FIG. 5, the rotary shaft 24 is journaled by ball bearings 40 supported by a casing 36.

As shown in FIG. 7, the range switching device $S_2$ is coupled to the rotary switching device $S_1$ through reduction gears $G_5$ and $G_6$. Assuming that the number of digits of the logarithm is represented by $n$, then the speed reduction ratio $N$ would be $n+\alpha$ in which case it should be selected such that $\alpha$ is suffi- ciently smaller than $n$, that electrodes corresponding to the maximum and minimum digits should be spaced sufficiently wide to prevent direct contacts thereof and that the speed reduction gear should have a proper value.

During one complete revolution of the rotary switching device $S_1$, brushes 15 and 16 of the range switching device rotate over an angle corresponding to one digit, thus sliding on electrodes of respective digits. The switching operation of the range switching device $S_2$ is controlled by the rotary switching device $S_1$ and relays $RL_1$ and $RL_2$, shown in FIG. 2. Terminals 28 through 34, inclusive, of electrodes 17 through 23, inclusive, are connected respectively to resistors $R_1$ through $R_7$, inclusive.

FIG. 2 shows an electrical circuit for detecting driving signals, in which the range switching device $S_2$ is shown as an automatic control circuit generally shown by a reference symbol AC, and resistors $R_1$ through $R_7$ of respective digits are shown as included in a potentiometer type balancing circuit PB. The automatic control circuit AC includes the rotary switching device $S_1$, the range switching device $S_2$ and relays $RL_1$, $RL_2$, $RL_3$ and $RL_4$, whereas the potentiometer type balancing circuit PB includes a logarithmic variable resistor LR, and auxiliary resistor $R_8$, resistors $R_1$ through $R_7$ for respective digits, a reference battery $E_2$, a variable resistor $R_9$ and a fixed resistor $R_{10}$ for current limiting. Relay $RL_2$ has contacts $rl_2$, $rl_2'$ and $rl_2''$ and relay $RL_1$ has contacts $rl_1$, $rl_1'$ and $rl_1''$. The relays operate to switch the ranges and to restrain each other. As shown in FIG. 2, relay $RL_1$ has a preference for clockwise direction or it functions to switch towards digits of lower orders, whereas relay $RL_2$ serves to switch in the opposite direction. Relay $RL_3$ includes a contact $rl_3$ and relay $RL_4$ includes a contact $rl_4$. The relays operate to switch the logarithmic variable resistor. More particularly, relay $RL_3$ operates to switch the logarithmic variable resistor LR from its minimum to its maximum value, while relay $RL_4$ operates to switch in the opposite direction.

A DC source $E_1$ is provided to operate the relays.

The operation of the novel logarithmic recording apparatus constructed as hereinabove described operates as follows:

When an electric signal is applied to input terminals A and B of the balancing circuit, an output corresponding thereto will be supplied to the input of the chopper CH. The output from the chopper is supplied to the servomotor SM after being amplified by the AC amplifier AM thus energizing the servomotor. Then brushes 9, 10, 1, 15 and 16 of the logarithmic variable resistor LR, rotary switching device $S_1$ and range switching device $S_2$ are rotated in the clockwise direction by the servomotor. At the instant when the brush 1 of the rotary switching device $S_1$ engages one end of the electrode 2, the brush 9 of the logarithmic variable resistor LR does not yet reach the position of the minimum value. Also the brush 16 of the range switching device $S_2$ does not reach the electrode 18. However, the relay $RL_1$ is energized by a circuit that can be traced from DC source $E_1$, through contact $rl_2$ of the relay $RL_2$, the coil of relay $Rl_1$, electrode 2 and brush 1 to the ground. Consequently, even when the brush 1 of the rotary switching device $S_1$ bridges electrodes 2 and 3, the relay $RL_2$ would not be energized due to the opening of the normal closed contact $rl_1'$ of the relay $RL_1$.

As respective brushes are further slightly rotated and when the brush 9 of the logarithmic variable resistor LR reaches the position of rotary angle $0°-d\theta$, the brush 1 of the rotary switching device $S_1$ to bridges electrodes 2 and 3. Since the brush 16 of the range switching device $S_2$ is already in contact with the electrode 18 to operate the relay $RL_3$, the electrical connection to the brush 10 of the logarithmic variable resistor LR is broken to prevent short-circuiting thereof. Further, as the connection to the brush 16 of the range switching device $S_2$ is interrupted by the contact $rl_1''$ of the relay $RL_1$, the operating range is still connected to the brush 15 which is now in contact with the electrode 17.

Upon further slight rotation of the respective brushes to bring the brush 9 of the variable resistor LR to the angular position of $0°+d\theta$, the brush 1 of the rotary switching device $S_1$ will firstly disengage the electrode 2 while it is still engaging the electrode 3. Then the energizing circuit for relay $RL_1$ traced hereinbefore will be broken, thus deenergizing relay $RL_1$. Due to the closure of the contact $rl_1$ of relay $RL_1$, the energizing circuit for the relay $RL_2$ is established which extends through brush 1, electrode 3, coil of the relay $RL_2$, contact $rl_1$ to DC source $E_1$, thus actuating relay $RL_2$. Then connections to the brush 10 of the logarithmic variable resistor LR and to the brush 16 of the range switching device $S_2$ are established, whereas the connection to the brush 15 interrupted by the contact $rl_2''$ thus advancing to the next succeeding digit. In this case, actual switching occurs at the instant when the brush 1 of the rotary switching device $S_1$ leaves electrode 2. It is advantageous to use such high speed relays as mercury relays as the relays.

As mentioned hereinabove when the brush of the rotary switching device $S_1$ is rotated in the clockwise direction as shown by an arrow to bridge electrodes 2 and 3, since relays $RL_1$ and $RL_3$ are in their operated condition, a DC current that flows from input terminal A through contact $rl_2''$ of relay $RL_2$, brush 15 of the range switching device $S_2$ and through resistor $R_1$ creates a voltage drop across resistor $R_1$, which is applied to the chopper CH via the brush 9 of the logarithmic variable resistor LR and contact $rl_4$ of relay $RL_4$ on one hand and through brush 15 and contact $rl_2''$ of relay $RL_2$ on the other hand. The output from the chopper is amplified by the AC amplifier to drive the servomotor until a balanced condition is reached.

Assuming now that input terminal B is at the reference voltage and that the resistance value of the variable resistor LR is 9 times larger than that of an auxiliary resistor $R_s$, then the maximum potential difference between the brush 9 of the logarithmic variable resistor LR and the terminal B would be 10 times larger than the minimum value. As the brush 1 of the rotary switching device $S_1$ is rotated in the direction indicated by an arrow from the position at which the brush bridges electrodes 2 and 3 to a position at which the brush 1 just leaves electrode 2, the relay $RL_2$ will be energized by the operating circuit traced hereinabove, thus switching the operating range of range switching device $S_2$ from resistor $R_1$ to resistor $R_2$ having a resistance 10 times larger than that of resistor $R_1$. In this manner, the logarithmic variable resistor RL is switched from the minimum value to the maximum value while at the same time the potential difference is switched from the minimum value of 1 to the maximum value of 10. In this manner, the range switching device $S_2$ is successively switched from the resistor $R_1$ corresponding to the maximum digit to the resistor $R_7$ corresponding to the minimum digit.

As shown in FIG. 2 a transfer switch $S_4$ is provided for restoring the starting point or the upper limit in order to perform maintenance. Also a switch $S_5$ is provided for restoring the limit switch which has stopped at the upper and lower limits to the state permitting recording. The switch 5 is of the self-restoring type which is rendered off only when a pushbutton is depressed.

Where it is desired to record an unknown DC current, the range switching device should be started from the maximum digit for securing safety of the circuit. To this end, after termination or commencement of recording, the range switching device must be restored to its starting point or upper limit.

To restore to the starting point, the brush side of the range switching device is switched to a point having a potential slightly higher than the maximum value of the logarithmic variable resistor or to the junction between resistors $R_{10}$ and $R_{11}$. In order to accomplish this, this point is always maintained at a potential higher than that of the brush of the logarithmic variable resistor so that the servomotor tends to rotate continuously and passes through the starting point. To avoid this trouble the servomotor should be stopped at the upper limit as well as at the lower limit. To accomplish this, a limit switch $S_3$ is directly coupled to the pulley PL and accordingly, the input side of the chopper is short-circuited whenever an input signal smaller than the minimum value to be recorded or larger than the maximum value is supplied to reduce the AC input to the servomotor to substantially zero, thus stopping it.

Thus, it will be clear that the present invention provides a novel wide range logarithmic recording device which can correctly and rapidly record electrical signals on continuous logarithmic scales of extremely wide range. To the contrary the prior art recording device was limited to signals of narrow range and respective digits were discontinuous.

The novel device is especially to record extremely small currents. By modifying the digit switching circuit of this invention similar to the circuit arrangement for measuring voltage, it becomes possible to record voltage.

While I have disclosed one embodiment of the present invention, it is to be understood that this embodiment is given by example only and not in a limiting sense.

I claim:

1. A wide range logarithmic recording apparatus comprising
   a range switching circuit including resistors connected to respective digits and arranged to receive electric signals to be recorded,
   a potentiometer type balancing circuit including a logarithmic variable resistor having a logarithmic characteristic,
   means for feeding input signals jointly to said range switching circuit and to said balancing circuit,
   an automatic control circuit including a rotary switching device coupled to said logarithmic variable resistor,
   a group of relays actuated by said range switching circuit and a range switching device controlled by said group of relays,
   a chopper connected to the outputs of said balancing circuit and said range switching circuit to receive the difference between the outputs from said balancing circuit and said range switching device and to cut off electric signals outside the recording range,
   a servomotor connected to and responsive to the output from said chopper and connected to drive said rotary switching device, said logarithmic variable resistor and said range switching device, and
   a writing mechanism driven by said range switching device to record said electric signals on a recording medium.

2. The wide range logarithmic recording apparatus, as set forth in claim 1, wherein
   said rotary switching device comprises,
   an insulating disc,
   two spaced electrodes defining a gap therebetween and having a predetermined length and mounted on said insulating disc,
   said logarithmic variable resistor having a zero rotary angle,
   the center of said gap between said electrodes is at the same angular position as said zero rotary angle of said logarithmic variable resistor,
   a shaft,
   a brush mounted on said shaft along with said logarithmic variable resistor at the same angular position.

3. The wide range logarithmic recording device as set forth in claim 1, wherein
   said range switching device comprises
   a bearing,
   a shaft journaled by said bearing,
   an insulating disc,
   a plurality of spaced electrodes arranged in an annular configuration on said insulating disc, each of said electrodes corresponding to each of said respective digits,
   the length of said electrodes corresponding to the maximum and minimum of said digits is longer than those corresponding to other digits,
   the spacing between said electrodes corresponding to said maximum and minimum digits is wider than the other spacings of said electrodes, the electrodes corresponding to those digits other than the maximum and minimum digits having equal lengths and spaced by equal gaps, the angle subtended by a gap other than the gap between electrodes corresponding to said maximum and minimum digits, and the angle subtended by the gap between said maximum and minimum digits being related in a predetermined manner with the length of said electrodes of said rotary switching device, and a pair of insulated brushes mounted on said shaft and adapted to slide on insulated stationary contact pieces.

4. The wide range logarithmic recording device, as set forth in claim 3, further including a limit switch comprising a rotary contact piece mounted on said shaft at an angular position coinciding with a bisector of an angle subtended by said pair of insulated brushes of said range switching device, a casing, and said insulated stationary contact pieces secured to said casing at positions corresponding to the positions of maximum and minimum values of said range switching device in a plane in which said rotary contact piece rotates.

5. The wide range logarithmic recording device, as set forth in claim 1, wherein said logarithmic variable resistor includes two brushes, said range switching device include two brushes, said automatic control circuit comprises said rotary switching device, said range switching device and a group of four relays operatively connected to said rotary switching device so as to be actuated by said rotary switching device to control a connection to said two brushes of said logarithmic variable resistor and to said two brushes of said range switching device.

6. The wide range logarithmic recording device, as set forth in claim 1, wherein said potentiometer type balancing comprises said logarithmic variable resistor, an auxiliary resistor associated therewith and a plurality of resistors connected to respective digits.

7. The wide range logarithmic recording device, as set forth in claim 1, further comprising a current limiting resistor, said range switching device includes a brush, said recording device further comprises a small value resistor, one end of said resistor being connected to a point of maximum value of said logarithmic variable resistor, and the other end of said small value resistor being connected to said current limiting resistor, and a switch for switching the connection to said small value resistor and to said brush of said range switching device.

8. The wide range logarithmic recording device, as set forth in claim 1 further comprising a rotary driving mechanism comprising said rotary switching device, said logarithmic variable resistor, said range switching device, a limit switch operatively connected to said range switching device, and a gear means for driving the members of said rotary driving mechanism at a predetermined gear ratio.